Aug. 1, 1961  G. SCHOHAN  2,994,831
MAGNETIC AMPLIFIER FREQUENCY SENSOR CIRCUITS
Filed July 28, 1959

INVENTOR.
G. SCHOHAN

BY
ATTORNEYS.

United States Patent Office 2,994,831
Patented Aug. 1, 1961

2,994,831
MAGNETIC AMPLIFIER FREQUENCY SENSOR CIRCUITS
George Schohan, Washington, D.C., assignor to the United States of America as represented by the Secretary of the Navy
Filed July 28, 1959, Ser. No. 830,166
1 Claim. (Cl. 329—110)
(Granted under Title 35, U.S. Code (1952), sec. 266)

The invention described herein may be manufactured and used by or for the Government of the United States of America for governmental purposes without the payment of any royalties thereon or therefor.

This invention relates to sensor circuits and more particularly to simplified sensor circuits applied to magnetic amplifiers.

In this invention novel circuitry is incorporated which provides for the sensor circuit to be connected directly with the bias or control circuit of a magnetic amplifier circuit. The arrangements illustrated hereinafter provide R.M.S. voltage or frequency sensitive circuits in combination with a magnetic amplifier. By combining sensor components in the control or bias circuit of a magnetic amplifier, a simplified sensing device for detecting changes in frequency or R.M.S. voltage of an alternating voltage supply source may be detected.

It is an object of this invention to provide a simplified sensor circuit for a magnetic amplifier.

It is another object of this invention to provide a sensor circuit for a magnetic amplifier for detecting frequency changes.

It is another object of this invention to provide a sensor circuit for detecting R.M.S. voltage changes in which sensor elements having opposite characteristics are used to accentuate the voltage change.

It is still another object of this invention to provide a sensor circuit for a magnetic amplifier which includes part of a load winding of the magnetic amplifier as the bias circuit.

It is a further object of this invention to provide a frequency sensitive sensor circuit for a magnetic amplifier including an inductor and a capacitor.

It is a still further object of this invention to provide a sensor for a magnetic amplifier in which the sensor element includes a resonant circuit.

Other objects and many of the attendant advantages of this invention will be readily appreciated as the same becomes better understood by reference to the following detailed description when considered in conjunction with the accompanying drawing wherein.

Figure 1:
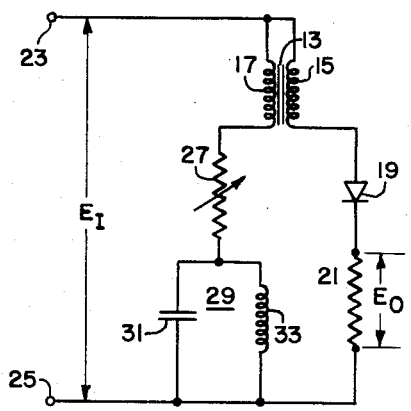
FIG. 1 illustrates a tuned sensor circuit applied to a single core magnetic amplifier.

Referring now to FIG. 1 of the drawing illustrating a sensor circuit applied to a single core magnetic amplifier, the magnetic amplifier has core 13, load winding 15 and control winding 17. Load winding 15 connects serially to rectifier 19 and load 21 across input terminals 23 and 25. An alternating input voltage $E_I$ is applied to terminals 23 and 25. Control winding 17 serially interconnects to variable resistor 27 and to tuned circuit 29 across input terminals 23 and 25. Tuned circuit 21 is comprised of capacitor 31 and resistors 33. An output voltage $E_O$ will appear across load 21.

In operation, an A.-C. voltage $E_I$ is applied across input terminals 23 and 25. Current will flow through the load circuit including load winding 15 and load 21 on alternate half cycles, for example, positive half cycles due to the rectifying action of rectifier 19. Current will flow through the control circuit including control winding 17, variable resistor 27 and resonant circuit 29 during both positive and negative half cycles of input voltage $E_I$. Resonant circuit 29 is usually tuned for resonance at a frequency below or above the lowest or highest operating frequency of the input voltage. The current flow through load winding 15 and hence the voltage drop $E_O$ across load 21 for a particular positive half cycle will depend upon the saturation level of core 13 caused by current flow through control winding 17 during a negative half cycle immediately previously to the particular positive half cycle of current flow through the load circuit. When the impedance of resonant circuit 29 changes due to a change in the input voltage frequency, the current flow through control winding 17 will be changed and the voltage drop $E_O$ across load 19 is correspondingly changed. Thus, a change in frequency of input voltage $E_I$ is indicated by a change in voltage $E_O$ across load 19.

Figure 2:
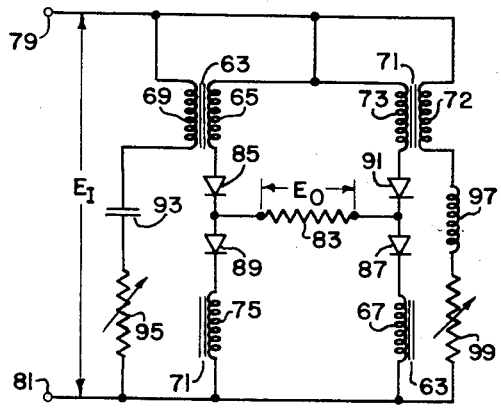
FIG. 2 illustrates a two core magnetic amplifier with a sensor circuit utilizing reactive components.

Referring now to FIG. 2 of the drawing, a two core magnetic amplifier is illustrated in combination with reactive sensor circuits. Core 63 has load windings 65 and 67 and control winding 69. Core 71 has load windings 73 and 75 and control winding 72. Cores 63 and 71 are each shown in two sections although each is a single integral structure. An A.C. input voltage $E_I$ is applied at input terminals 79 and 81 and a load voltage $E_O$ will appear across load 83. Load windings 65 and 67 of core 63 interconnect serially through load 83 and rectifiers 85 and 87 to input terminals 79 and 81. Load windings 75 and 73 serially interconnect through load 83 and rectifiers 89 and 91 to input terminals 79 and 81. Control winding 69 interconnects serially through capacitor 93 and variable resistor 95 to input terminals 79 and 81. Control winding 72 interconnects serially through inductor 97 and variable resistor 99 to input terminals 79 and 81.

In operation an alternating current voltage $E_I$ is applied to input terminals 79 and 81. Alternating current will flow through the control circuit of core 63 including winding 69, capacitor 93 and variable resistor 95 and through the control circuit of core 71 including control winding 72, inductor 97 and variable resistor 99. Direct current will flow through the load circuits of cores 63 including load windings 65 and 67 and through the load circuit of core 71 including load windings 73 and 75. The amount of current flow through the load circuits will depend upon the amount of current flow through the control circuits as described with respect to FIG. 1 of the drawing. Initially the variable resistors 95 and 99 of the control circuits of cores 63 and 71 are adjusted such that the current flow through the load circuit of core 63 is equal to the current flow through the load circuit of core 71 at the desired or reference operating frequency of the input voltage and the voltage $E_O$ across load 83 will be zero. When the input frequency changes from the desired or reference value, the current flow through the control windings will no longer be equal and as a result the current flow through the load windings will be unequal and a voltage will appear across $E_O$. For example, if the input voltage frequency should increase, the impedance of capacitor 93 would be decreased and the impedance of inductor 97 would be increased. The current flow through control winding 69 will be increased and the current flow through control winding 72 will be decreased. Since the current flow through load windings 65 and 67 will no longer be equal to the current flow through load windings 73 and 75, there will be a current flow through load 83 and as a result a voltage $E_O$ will appear across load 83.

Figure 3:
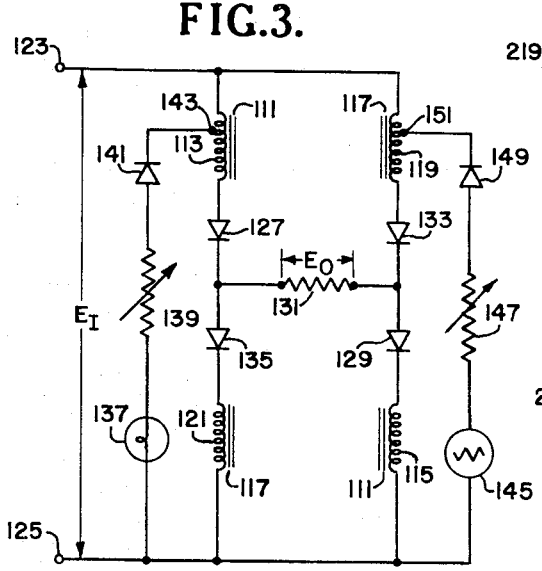
FIG. 3 illustrates a magnetic amplifier with sensor circuits employing a lamp and a thermistor.

Referring now to FIG. 3 of the drawing, a sensor circuit employing a tungsten lamp and a thermistor as sensor elements is illustrated. The magnetic amplifier circuit is comprised of core 111 with load windings 113 and 115 and core 117 with load windings 119 and 121. Load windings 113 and 115 serially interconnect between input terminals 123 and 125 through rectifiers 127, 129 and load 131. Load windings 119 and 121 serially interconnect between input terminals 123 and 125 through load 131 and rectifiers 133 and 135. A first sensor circuit comprises lamp 137, variable resistor 139 and rectifier 141 serially interconnected between tap 143 on winding 113 and input terminal 125. A second sensor circuit comprises a thermistor 145, adjustable resistor 147 and rectifier 149 serially interconnected between tap 151 on load winding 119 and input terminal 125.

In operation, an alternating current voltage $E_I$ is applied to input terminals 123 and 125. The current flow through the load windings of cores 111 and 117 is dependent upon the current flow through the bias circuits of cores 111 and 117, respectively. Current will flow unidirectionally through the load circuits of cores 111 and 117 during particular half cycles of the input voltage $E_I$ and through the bias circuits of cores 111 and 117 during alternate half cycles of the input voltage. For example, unidirectional current may flow through the load circuits during positive half cycles and through the bias circuits during negative half cycles of the input voltage. The current flow through the load circuits is governed by the magnetic flux levels in the cores which in turn are established by the current flow through the bias circuits. The current flow through the bias circuit of core 111 is first regulated by adjusting variable resistor 139. Variable resistor 139 is adjusted until the current flow through the bias circuit of core 111 is equal to the current flow through the bias winding of core 117 when input voltage $E_I$ is at a desired R.M.S. reference level. With this condition, the current flow through load windings 113 and 115 of core 111 will be equal to the current flow through load windings 119 and 121 of core 117 and the voltage $E_O$ across load 131 therefore will be zero. When the R.M.S. value of the input voltage varies in either direction from the desired reference level, the current flow through the bias circuits will change. The change in current flow through the bias circuit of core 111, however, will be different and in an opposite direction to the change in current flow through the bias circuit of core 117 since the bias circuit of core 111 contains a tungsten lamp as a nonlinear device and the bias circuit of core 117 contains a thermistor. For example, if $E_I$ should increase in value, the resistance of lamp 137 will increase and the current flow through the bias circuit will be decreased. On the other hand, the resistance of thermistor 145 will decrease and the current flow through the bias circuit of core 117 will be increased. The unbalance of current flow in the bias circuits results in a greater current flow through load windings 113 and 115, for example, than the current flow through load windings 117 and 119. The unequal current flow in the pairs of load windings of the cores causes a current flow through load 131. An R.M.S. voltage input variation is detected by voltage $E_O$ appearing across load 131.

Figure 4:
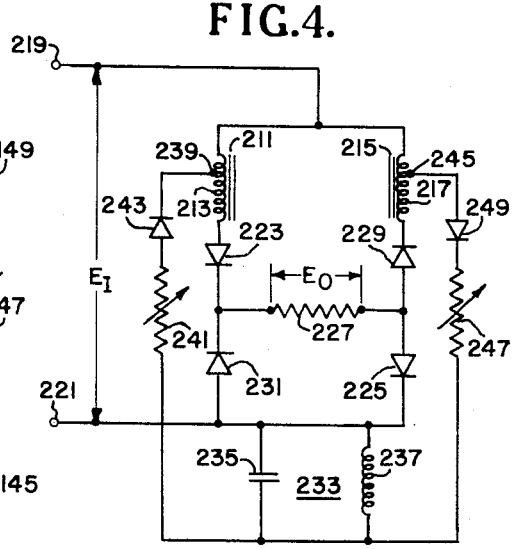
FIG. 4 illustrates a magnetic amplifier in which a tuned circuit is employed in the sensor circuit.

Referring now to FIG. 4 of the drawing, a magnetic amplifier is illustrated in which a resonant circuit is used in the sensor circuit. Core 211 has load winding 213 and core 215 has load winding 217. Load winding 213 connects to input terminals 219 and 221 through rectifiers 223, 225 and load 227. Load winding 217 connects to input terminals 219 and 221 through load 227 and rectifiers 229 and 231. A resonant circuit 233 is comprised of capacitor 235 and inductor 237. Resonant circuit 233 is connected serially between input terminal 221 and tap 239 on load winding 213 through variable resistor 241 and rectifier 243. Resonant circuit 233 is also connected serially between input terminal 221 and tap 245 on load winding 217 through variable resistor 247 and rectifier 249.

Unidirectional current will flow through load winding 213 of core 211 and through the bias circuit of core 215 during particular half cycles, for example, positive half cycles of the input voltage $E_I$ and through load winding 217 of core 215 and through the bias circuit of core 211 during alternate half cycles, for example, negative half cycles of the input voltage. With the bias circuits connected as shown, alternating current will flow through resonant circuit 233. Resonant circuit 233 is tuned to resonate at a frequency below or above the lowest or highest operating frequency of the input voltage $E_I$. Resistors 241 and 247 are adjusted to give a certain output at the desired reference frequency level of $E_I$. For example, if circuit 233 is tuned to resonate at a frequency below the lowest operating frequency of $E_I$, when the frequency of $E_I$ varies above a desired reference frequency, the current through the bias circuits of cores 211 and 215 will increase, causing the current flow through load windings to decrease, and as a result, the current flow through load 227 will decrease and the voltage across $E_O$ will decrease. Conversely, when the frequency of the input voltage $E_I$ varies below the desired reference frequency, the impedance of resonant circuit 233 is increased, the current flow through the bias circuits is decreased and the current flow through the load circuits is increased, causing a greater voltage drop across $E_O$.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent of the United States is:

A frequency sensitive sensor circuit in combination with a magnetic amplifier comprising a magnetic amplifier having a saturable core, a load winding on said core, a control winding on said core, a pair of input terminals, load means, unilateral impedance serially interconnecting said load winding and said load means to said input terminals whereby unidirectional current is caused to flow through said load winding and said load means, a tuned circuit comprising a capacitor and inductor connected in parallel, a variable resistance means interconnecting said control winding and said tuned circuit to said input terminals, said input terminals adapted to be connected to a source of A.-C. voltage, whereby a change in frequency of said A.-C. voltage will change the impedance of said tuned circuit and the current flow through said control winding and the output voltage across said load means is changed.

References Cited in the file of this patent

UNITED STATES PATENTS

| | | |
|---|---|---|
| 2,742,567 | Hansell | Apr. 17, 1956 |
| 2,947,863 | Buie | Aug. 2, 1960 |